United States Patent
Humphrey

(10) Patent No.: US 6,493,154 B1
(45) Date of Patent: Dec. 10, 2002

(54) METHOD AND APPARATUS FOR FURTHER ENHANCED HIGH-SPEED PERCEPTION (EHP) OF A MOVING OBJECT USING AN OPTICAL SHUTTER SPECTACLE AND THE METHOD OF VISUAL FRAME RATE TRAINING

(76) Inventor: John M. Humphrey, 25967 Mar Vista Ct., Los Gatos, CA (US) 95033

( * ) Notice: Subject to any disclaimer, the term of this patent is extended or adjusted under 35 U.S.C. 154(b) by 0 days.

(21) Appl. No.: 09/628,371

(22) Filed: Jul. 31, 2000

(51) Int. Cl.[7] .................... G02B 9/08; G02F 1/1335; G02C 7/10
(52) U.S. Cl. .................... 359/738; 349/13; 351/44
(58) Field of Search .................... 359/738; 349/13, 349/14, 15; 351/44, 246

(56) References Cited

U.S. PATENT DOCUMENTS

| | | | | |
|---|---|---|---|---|
| 4,279,474 A | * | 7/1981 | Belgorod | 350/331 R |
| 5,671,035 A | * | 9/1997 | Barnes | 351/454 |
| 6,097,450 A1 | * | 8/2001 | Humphrey | 349/13 |

* cited by examiner

*Primary Examiner*—Huy Mai
*Assistant Examiner*—Timothy Thompson
(74) *Attorney, Agent, or Firm*—John J. Leavitt

(57) ABSTRACT

Presented are electronically controlled optical shutter spectacles for achieving biofeedback between the operation of the optical shutter spectacles when worn and the physiological rate and timing of human visual processing of the wearer of the spectacles to provide further enhanced perception of fast-moving objects or surroundings and to train and condition the human physiology to retain enhanced motion perception capability for an indeterminate time following removal of the spectacles.

10 Claims, 3 Drawing Sheets

METHOD AND APPARATUS FOR FURTHER ENHANCED HIGH-SPEED PERCEPTION (EHP) OF A MOVING OBJECT USING AN OPTICAL SHUTTER SPECTACLE AND THE METHOD OF VISUAL FRAME RATE TRAINING

BACKGROUND OF THE INVENTION

1. Field of the Invention

This invention relates to the method and apparatus for enhancing human visual perception of a linearly moving object, and particularly to spectacles equipped with optical shutters that function to enhance the ability of the human visual physiology to track the path of an object moving at high speed and over an interval of elapsed time to train or condition the human visual physiology to retain some of this enhanced ability even in the absence of the spectacles.

2. Description of the Prior Art

This invention is an improvement on the method and apparatus of this inventor's U.S. Pat. No. 6,097,450 entitled "METHOD AND APPARATUS FOR ENHANCED HIGH-SPEED PERCEPTION (EHP) OF A MOVING OBJECT USING AN OPTICAL SHUTTER SPECTACLE". That invention teaches the use of optical shutter spectacles operated close to the flicker fusion frequency of the wearer both to provide a more distinct image of a linearly moving object (i.e. an object whose motion has no inherent periodicity of its own) and to enable the wearer to more accurately predict the object's future position to thereby enable initiation of a more timely and appropriate physical response to meet the challenge or threat posed by the fast moving object. The method of my previously noted invention achieves this objective firstly by operating near the flicker fusion frequency to provide only one image in each visual frame of the viewer and, secondly, by reducing the spatial uncertainty of the moving object in each visual frame by enabling viewing of the object for only part of each visual frame.

The teachings of this inventor's U.S. Pat. No. 6,097,450 present the spectacle wearer's flicker fusion frequency as an independent variable, possibly different for each individual, and the optical shutter rate of the spectacles as a dependent variable to be adjusted as close as possible to the wearer's flicker fusion frequency. However early in the development of optical shutter spectacles providing EHP benefits, the inventor observed that the human visual system responds to cyclical optical shutter images in a manner analogous to an "optical pace maker" and that this biofeedback mechanism can be used to further enhance human visual perception of fast moving objects or surroundings. This optical shutter visual pacemaker biofeedback mechanism is herein generically referred to as "Visual Frame Rate Training".

Accordingly one of the objects of this invention is to provide the biofeedback between the operation of optical shutter spectacles and the wearer's visual information processing.

Another object of this invention is to provide Visual Frame Rate Training that can be used to further improve the phenomena of Enhanced High-Speed Perception (EHP) using optical shutter spectacles.

Yet another object of this invention is to provide a method and apparatus for Visual Frame Rate Training with optical shutter spectacles that can be used to enhance perception of moving objects without using optical shutter spectacles.

The invention possesses other objects and features of advantage, some of which, with the foregoing will be apparent from the following description and the drawings. It is to be understood however that the invention is not limited to the embodiment illustrated and described since it may be embodied in various forms within the scope of the appended claims.

SUMMARY OF THE INVENTION

In terms of broad inclusion, the invention comprises electronically controlled optical shutter spectacles utilized by a method for achieving biofeedback between the operation of the optical shutter spectacles and the physiological rate and timing of human visual processing of the wearer of the spectacles to provide further enhanced perception of fast-moving objects or surroundings and to train the human physiology to retain enhanced motion perception capability for an indeterminate time following removal of the spectacles.

DESCRIPTION OF THE PREFERRED EMBODIMENT

The enhanced high-speed perception (EHP) optical shutter spectacles with visual frame rate training according to the instant invention utilize the same LCD lens structure and the same basic electronic components as the optical shutter spectacles described in my U.S. Pat. No. 6,097,450, the disclosure of which is included herein by reference. The improvements disclosed herein lie both in the use of the visual frame rate training biofeedback mechanism and in the use of existing and additional structures to monitor and direct this process.

Figure 1:
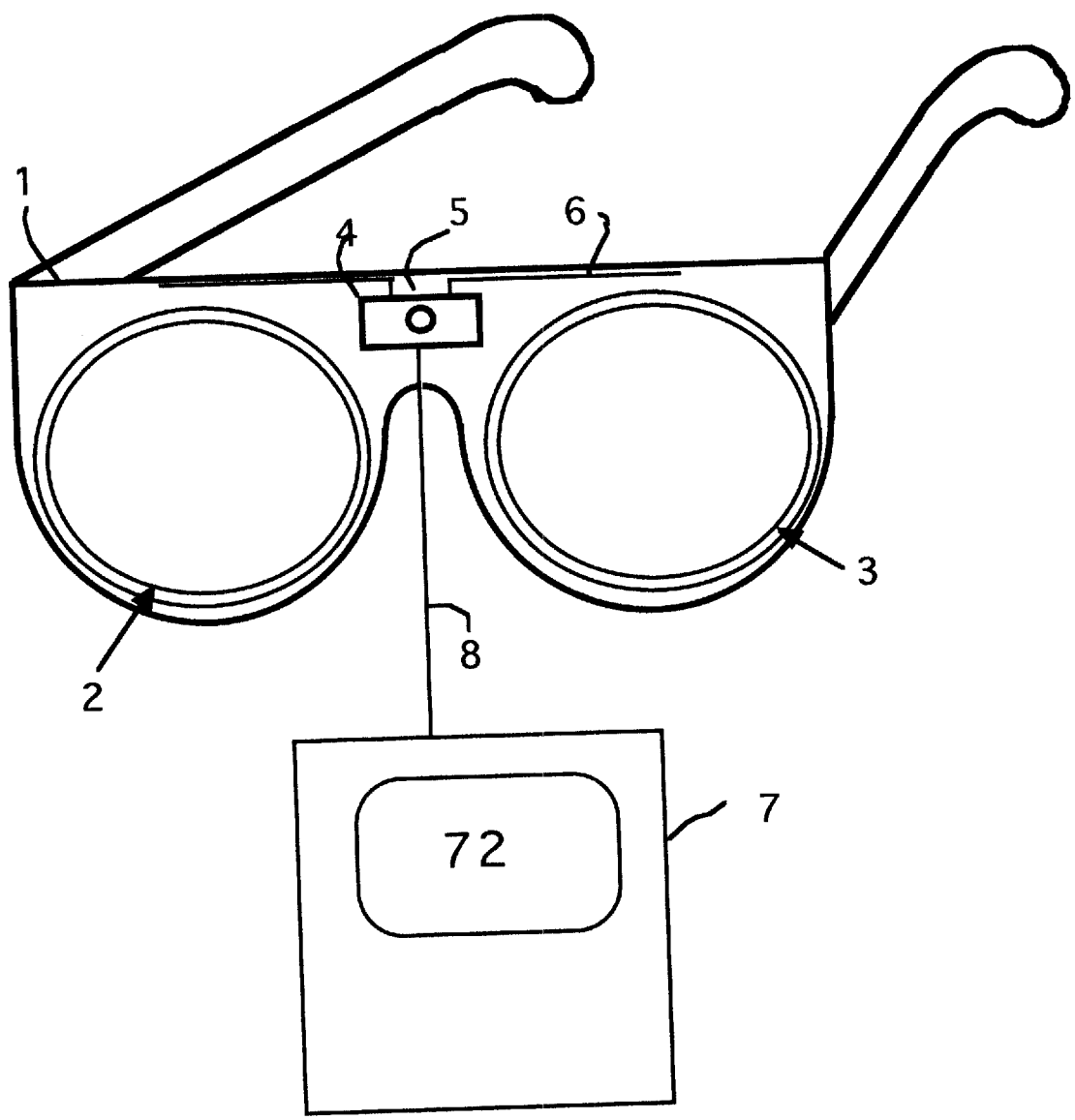
FIG. 1 is a frontal perspective view of the optical shutter spectacles incorporating an attached meter to measure and present the optical shutter frame rate.

In terms of greater detail, the enhanced high-speed perception (EHP) optical shutter spectacles of the instant invention shown in FIG. 1 comprise a spectacle frame 1 having a nose bridge area and temple members and provided with a keyhole opening in the nose bridge area of the frame. The spectacles have a right lens 2 and a left lens 3 each comprised of a single or, optionally, multiple node liquid crystal displays. The operation of the lenses is controlled by an electronics module 4 which is partially visible from the front through the keyhole opening in the nose bridge area of the spectacle frame. The front of the electronics module 4 contains a nodalized light sensor array 5, which independently senses the ambient brightness in one or more nodalized areas of the field of view. The electronics module uses this information on sensed ambient brightness distribution to control the optical shutter duty cycle in the nodes of the liquid crystal display lenses. The spectacles include two capacitive sensor wires 6 embedded near the top of the electronics module to provide user input control. The apparatus also includes a digital frequency meter 7 and a pair of input wires 8 transmitting the same electronics output signal used to operate the LCD lenses.

The following paragraphs describe the use of this apparatus to provide further enhanced perception of fast-moving objects or surroundings using the method of visual frame rate training.

Figure 2:
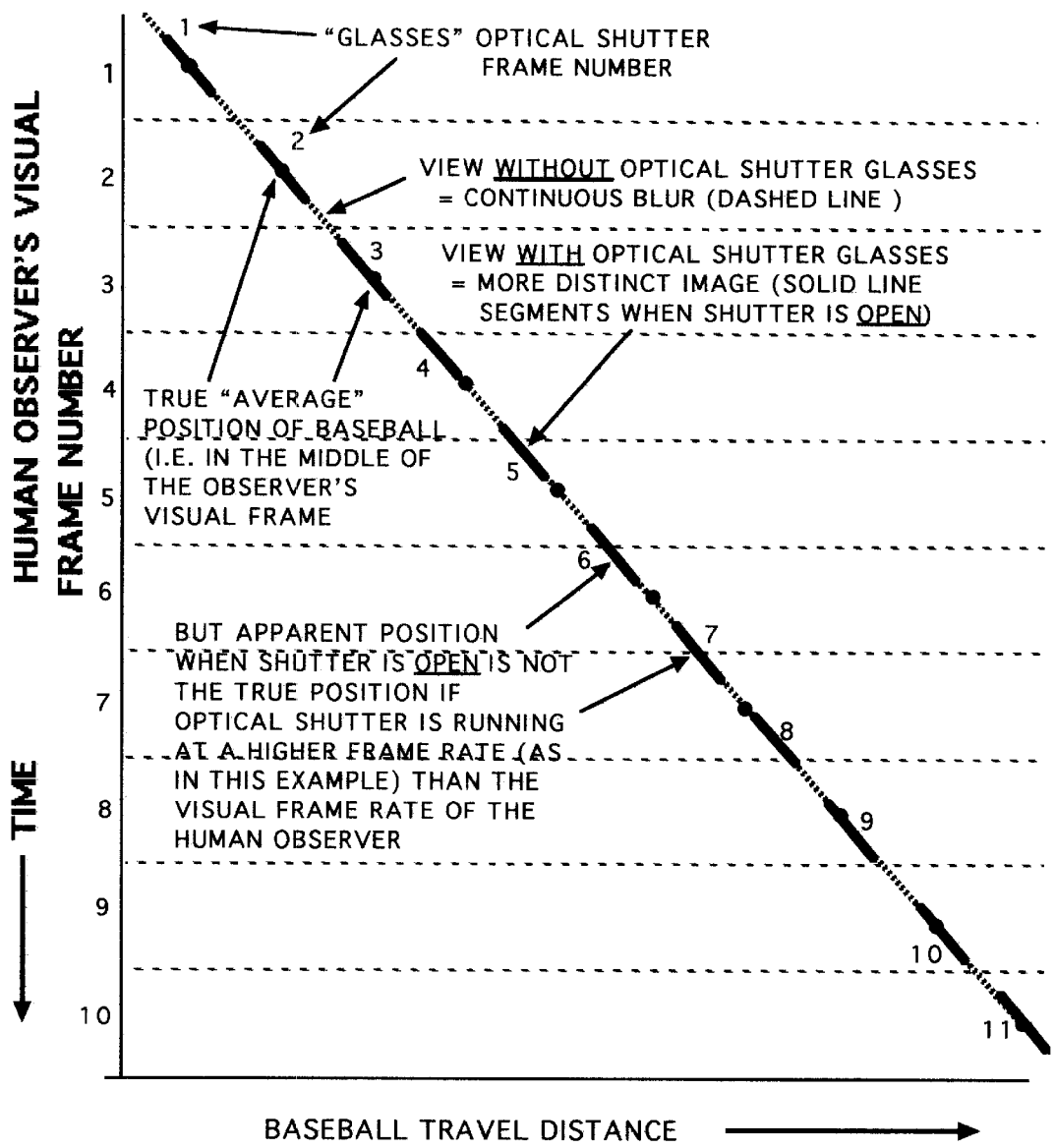
FIG. 2 is a distance vs time plot of a moving baseball as observed both with the unaided eye (dashed line) and with optical shutter spectacles operating at 50% open and 110% of the wearer's visual frame rate (solid line).

The importance of keeping the optical shutter frame rate of the spectacles as close as possible to the wearer's visual frame rate (as measured by the observer's flicker fusion frequency) when attempting to achieve enhanced perception of a moving object is shown in the FIG. 2 example of a moving baseball. If the optical shutter rate of the spectacles is faster (since slower would cause flicker) than the human observer's visual frame rate, the apparent position of the object in the observer's visual frame both recedes relative to the true position of the object and periodically creates multiple images of the object. Without optical shutter spectacles, the human eye sees a continuous blur shown by the dashed line. With optical shutter spectacles open 50% of the time, the eye sees a series of 50% long blurs (when the optical shutter is open) of the moving baseball with 50% space in between (when the optical shutter is closed) as shown by the solid line segments.

However as shown in the FIG. 2 example, if the optical shutter spectacles are operating at 110% of the wearer's visual frame rate, the perceived speed of the ball is slower than the actual speed. In the FIG. 2 example the optical/shutter image of the ball was assumed to be centered on the true position of the ball in the first visual frame of the human observer. However in the 2nd and 3rd visual frames the optical shutter image of the ball as presented by the spectacles lags the true position because the optical shutter spectacles are operating 10% faster than the visual frame rate of the observer. During the 4th thru 7th visual frames of the human observer, the optical shutter is actually open twice during the human observer's visual frame producing two images of the baseball, one that lags the true position and one that leads the true position. During the 8th through 10th visual frame, the optical shutter is again only open once during the human observer's visual frame providing one image of the baseball that leads the true position in visual frame #8 and then drifts back to be centered on the true position in frame #10. While operation of the optical shutter in the FIG. 2 example would indeed produce a more distinct image of the moving baseball, the 10% error in apparent speed and the presence of multiple images in about ⅓ of the frames would be expected to reduce the visual benefits of a more distinct image provided by the optical shutter and potentially reduce the observer's ability to accurately predict the motion of the ball. Therefore as taught in this inventor's U.S. Pat. No. 6,097,450, achieving the benefits of enhanced High Speed Perception require that the optical shutter spectacles be operated close to the visual frame rate of the wearer.

The first Visual Frame Rate Training biofeedback phenomenon of this invention is the visual synchronization of the wearer of the spectacles that occurs when the optical shutter spectacle frame rate is adjusted close to and then maintained for an interval close to the visual frame rate of the wearer. The cycles of light and dark produced by the optical shutter provide a visual pacemaker stimulus to the human visual system that apparently synchronizes the visual frame rate of the wearer with the spectacles. This phenomenon of synchronization can be observed by adjusting the glasses so that there is still a hint of flicker in the field of view (i.e. with the optical shutter frequency of the spectacles adjusted just slightly slower than the natural flicker fusion frequency of the wearer). Within a few seconds the hint of flicker disappears as the visual frame rate (flicker fusion frequency) of the wearer decreases slightly and synchronizes with the optical shutter frequency rate of the spectacles. Further confirmation that this biofeedback phenomenon is occurring is presented in the next paragraph.

The second Visual Frame Rate Training biofeedback phenomenon of this invention constitutes acceleration of the wearer's visual frame rate (flicker fusion frequency) in response to a gradual increase over time of the optical shutter frame rate of the spectacles. The apparatus of FIG. 1 is used to both accomplish and measure this phenomenon. The wearer is positioned facing a visual field of constant brightness and the glasses are turned on and adjusted close to the wearer's flicker fusion frequency until flicker just disappears and the resulting reference optical shutter frequency (and visual frame rate) is noted (ideally by an assistant) on the digital frequency meter. The assistant then slowly (current experiments have used several minutes) increases the optical shutter frequency by about 5 frames per second with the frequency again noted by the assistant. At that point the assistant rapidly increases the optical shutter frequency by about another 5 frames per second (to decouple the optical shutter frame rate from the wearer's visual frame rate) and then immediately decreases the optical shutter frequency stopping when the presence of flicker is first noted by the wearer. The assistant then reports the optical shutter frequency where the wearer reported the onset of flicker.

In these experiments, the wearers consistently report the onset of flicker at an optical shutter frame rate close to the rate before the rapid increase indicating a visual frame rate (flicker fusion frequency) of the wearer about 5 frames per second higher than the wearer's natural visual frame rate when the experiment started. This higher flicker fusion frequency of the wearer indicates that the optical shutter "visual pace maker" stimulus of the optical shutter spectacles has successfully accelerated the wearer's visual frame rate (as measured by the flicker fusion frequency) by about 5 frames per second above the wearer's normal physiological rate under the existing brightness conditions. The occurrence of this visual pace maker acceleration of the visual frame rate of the wearer provides further corroboration to the previously noted phenomenon of physiological synchronization since visual frame rate acceleration logically requires synchronization.

The third Visual Frame Rate Training biofeedback phenomenon of this invention is conditioned retention of acceleration of the human visual frame rate. Prior to this invention visual frame rate was regarded as an inherent involuntary biological response driven primarily by the level of ambient brightness. However this invention demonstrates that visual frame rate can be increased and retained using the stimulus of an optical shutter. The whole field of athletic conditioning by repetitive training is based on techniques to improve physiological responses beyond the level of an untrained individual. Since visual frame rate is just another controllable physiological process, it appears and it has been demonstrated that repeated conditioning to an accelerated visual frame rate using optical shutter spectacles will condition the human visual system to continue to operate at a higher visual frame rate for a period of time without wearing the glasses.

The foul ball reaction time analysis presented in FIG. 7 of the inventor's U.S. Pat. No. 6,097,450 was updated to include the effects of an increase in the observer's visual frame rate from 70 frames per second (used in the earlier analysis) to 85 frames per second. This updated analysis is presented in FIG. 3. A baseball batter must initiate the swing of the bat in time to make contact with the ball as it reaches home plate. The FIG. 3 analysis predicts that an uncertainty in the batter's mind on when the ball will reach the plate of about 0.020 seconds will result in an "average" 45 degree error in the position of the bat resulting in a foul ball even if the batter's intention was to hit the ball to center field. The smaller this time uncertainty when the batter initiates the swing, the smaller the average angular dispersion of the ball from the batter's intended direction. For this analysis, the "allowable foul ball reaction time" is the length of time before the ball reaches home plate when the ball's arrival time uncertainty in the batter's mind equals the value that will produce an average hitting dispersion of 45 degrees.

Figure 3:
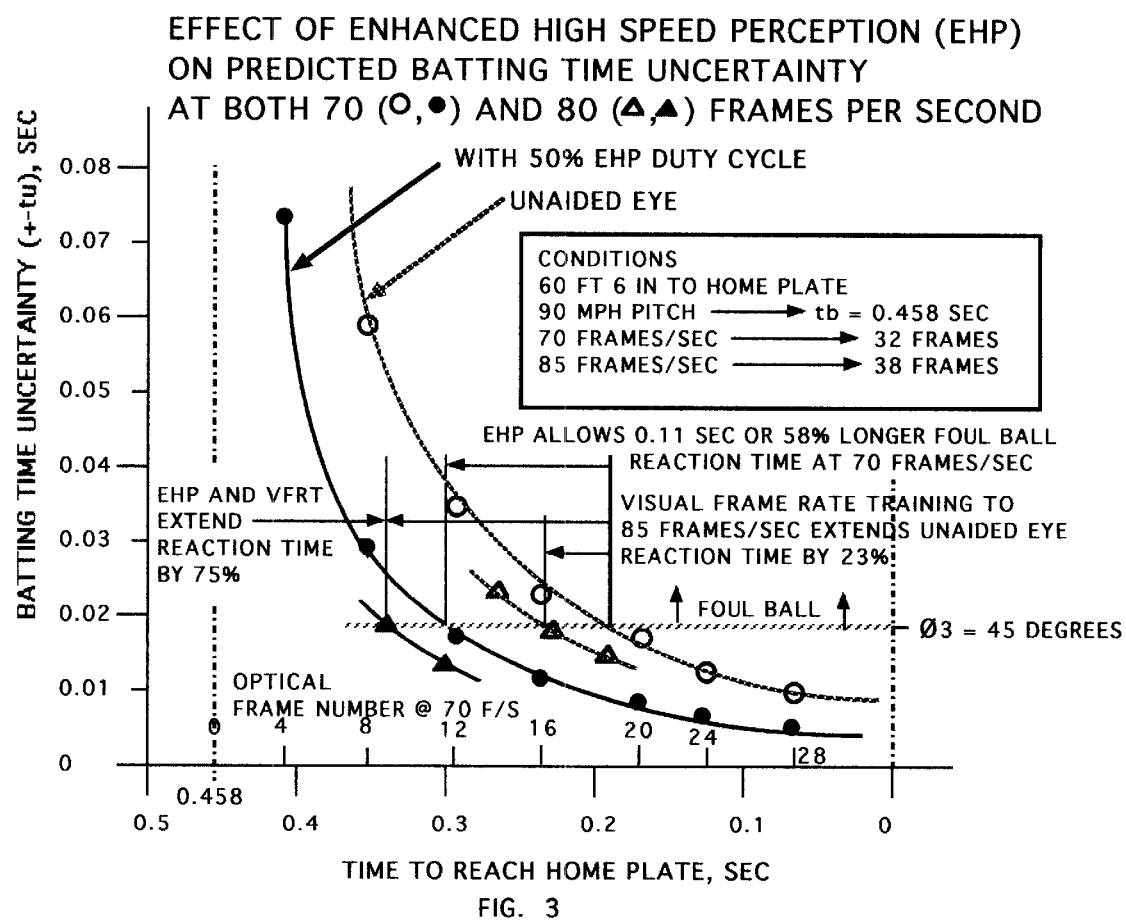
FIG. 3 presents an analysis of the effects of both optical shutter operation and the increase in the wearer's visual frame rate due to visual frame rate training on the foul ball reaction time for a baseball batter.

The results of the updated analysis presented in FIG. 3 show that an increase in the human visual frame rate from 70 to 85 frames per second results in significant improvements in allowable foul ball reaction time. This means a reduced angular dispersion with fewer foul balls and better placement of the ball where the batter intended. Using optical shutter spectacles (closed triangle), an 85 frame per second visual frame rate achieved through visual frame rate training would increase the foul ball reaction time by 75% over unaided vision at 70 frames per second compared to only a 58% increase with optical shutter spectacles at 70 frames per second. Unaided vision at 85 frames per second achieves a calculated 23% increase in foul ball reaction time compared to unaided vision at 70 frames per second. In competitive sports like baseball where even a 5% or 10% improvement in allowable reaction time is important, both of these calculated improvements are significant indicating a significant performance incentive for the Visual Frame Rate Training method of this invention used either to further enhance motion perception with optical shutter spectacles or to condition the human visual system to a faster visual frame rate without spectacles for sports (like soccer) where glasses could present a safety hazard.

Having thus described the invention, what is believed to be new and novel and sought to be protected by letters patent of the United States is as follows.

I claim:

1. The method of enhancing the ability of a human observer having a characteristic flicker fusion frequency under a set of existing observational conditions to resolve the motion and predict the future position of a linearly fast-moving object through the use of a pair of electronically powered frequency-adjustable optical shutter spectacles, the method comprising:
   a) providing for a human observer visual observation through said frequency-adjustable optical shutter spectacles of an illuminated scene;
   b) controlling the optical shutter spectacles so that they alternately open and close to provide the human observer with a view of the scene when open and to obscure the human observer's view of the scene when closed;
   c) selectively adjusting the optical shutter frequency of the spectacles to be sufficiently close, say approximately 0 to 3 frames per second to the human observer's characteristic flicker fusion frequency; and
   d) maintaining the adjusted frequency for an interval sufficient to enable the stimulus of the optical shutter frequency on the human observer to synchronize the observer's flicker fusion frequency with the optical shutter frequency.

2. As an article of manufacture:
   a) a pair of electronically powered spectacles having lenses selectively operable as optical shutters providing the wearer with an image of a field of view when the optical shutters are open and selectively operable to effect substantially complete visual blockage when the optical shutters are closed;
   b) means mounted on said spectacles selectively adjustable to operate said optical shutter lenses at a shutter frequency less than 125% of the flicker fusion frequency of a wearer to enable a wearer to achieve enhanced resolution of fast-moving objects in the field of view;
   c) means for selectively manually adjusting both the interval of visual blockage in each cycle and the shutter frequency to further enhance the wearer's visual resolution of fast-moving objects in the field of view;
   d) means responsive to increases in ambient brightness after manual adjustment to cause the interval of visual blockage to increase at a constant shutter frequency whereby both constant perceived brightness and constant flicker fusion frequency of the wearer are maintained at the manually adjusted level; and
   e) a digital frequency meter operatively connected to the spectacles to indicate the optical shutter frequency of the spectacles.

3. The method of enhancing the ability of a human observer having a characteristics flicker fusion frequency under a set of existing observational conditions to resolve the motion and predict the future position of a linearly fast-moving object through the use of a pair of electronically powered frequency-adjustable optical shutter spectacles, the method comprising:
   a) providing for a human observer visual observation through said frequency-adjustable optical shutter spectacles of an illuminated scene;
   b) controlling the optical shutter spectacles so that they alternately open and close to provide the human observer with a view of the scene when open and to obscure the human observer's view of the scene when closed;
   c) selectively adjusting the optical shutter frequency of the spectacles to be sufficiently close, say approximately 0 to 3 frames per second to the human observer's characteristic flicker fusion frequency;
   d) maintaining the adjusted frequency for an interval sufficient to enable the stimulus of the optical shutter frequency on the human observer to synchronize the observer's flicker fusion frequency with the optical shutter frequency; and
   e) wherein the frequency rate of the optical shutter is incrementally increased over time to synchronously increase the flicker fusion frequency rate of the human observer to match the incrementally increased frequency rate of the optical shutter.

4. The method of enhancing the ability of a human observer having a characteristic flicker fusion frequency under a set of existing observational conditions to resolve the motion and predict the future position of a linearly fast-moving object through the use of a pair of electronically powered frequency-adjustable optical shutter spectacles, the method comprising:
   a) providing for a human observer visual observation through said frequency-adjustable optical shutter spectacles of an illuminated scene;
   b) controlling the optical shutter spectacles so that they alternately open and close to provide the human observer with a view of the scene when open and to obscure the human observer's view of the scene when closed;

c) selectively adjusting the optical shutter frequency of the spectacles to be sufficiently close, say approximately 0 to 3 frames per second to the human observer's characteristic flicker fusion frequency;

d) maintaining the adjusted frequency for an interval sufficient to enable the stimulus of the optical shutter frequency on the human observer to synchronize the observer's flicker fusion frequency with the optical shutter frequency; and e) wherein a fast-moving object is introduced into the scene at any point in the sequence for viewing by the observer.

5. The method of enhancing the ability of a human observer having a characteristic flicker fusion frequency under a set of existing observational conditions to resolve the motion and predict the future position of a linearly fast-moving object through the use of a pair of electronically powered frequency-adjustable optical shutter spectacles, the method comprising:

a) providing for a human observer visual observation through said frequency-adjustable optical shutter spectacles of an illuminated scene;

b) controlling the optical shutter spectacles so that they alternately open and close to provide the human observer with a view of the scene when open and to obscure the human observer's view of the scene when closed;

c) selectively adjusting the optical shutter frequency of the spectacles to be sufficiently close, say approximately 0 to 3 frames per second to the human observer's characteristic flicker fusion frequency;

d) maintaining the adjusted frequency for an interval sufficient to enable the stimulus of the optical shutter frequency on the human observer to synchronize the observer's flicker fusion frequency with the optical shutter frequency; and e) wherein the human observer is moving through fixed surroundings and observing the relative motion of the surroundings as fast-moving objects.

6. The method according to claim 3, wherein increased flicker fusion frequency is maintained for a sufficient duration to condition the observer's visual system to operate at a higher flicker fusion frequency when the spectacles are removed.

7. The method according to claim 3, wherein a fast-moving object is introduced into the scene for viewing by the observer.

8. The method according to claim 6, wherein a fast-moving object is introduced into the scene for viewing by the observer.

9. The method according to claim 3, wherein the human observer is moving through fixed surroundings and observing the relative motion of the surroundings as fast moving objects.

10. The method according to claim 6, wherein the human observer is moving through fixed surroundings and observing the relative motion of the surroundings as fast moving objects.

* * * * *